United States Patent [19]

Mehta

[11] 4,283,918
[45] Aug. 18, 1981

[54] LIQUID PHASE SEPARATION IN ABSORPTION REFRIGERATION

[75] Inventor: Gurmukh D. Mehta, Warrenton, Va.

[73] Assignee: Intertechnology/Solar Corporation, Warrenton, Va.

[21] Appl. No.: 59,387

[22] Filed: Jul. 20, 1979

[51] Int. Cl.³ .............................................. F25B 15/00
[52] U.S. Cl. ....................................................... 62/112
[58] Field of Search ............................. 62/112; 252/69

[56] References Cited

U.S. PATENT DOCUMENTS

| 2,163,899 | 6/1939 | Walker et al. | 252/69 |
| 3,458,445 | 7/1969 | Macriss et al. | 62/112 |
| 3,478,530 | 11/1969 | Aronson | 62/112 |
| 3,977,204 | 8/1976 | Bourne | 62/112 |

*Primary Examiner*—Lloyd L. King
*Attorney, Agent, or Firm*—John T. Roberts

[57] ABSTRACT

An absorption refrigerator in which the refrigerant is miscible in the absorbent at the relatively low absorbing temperature and is at least partly immiscible at elevated temperatures, allowing separation of refrigerant and absorbant in the liquid phase.

1 Claim, 4 Drawing Figures

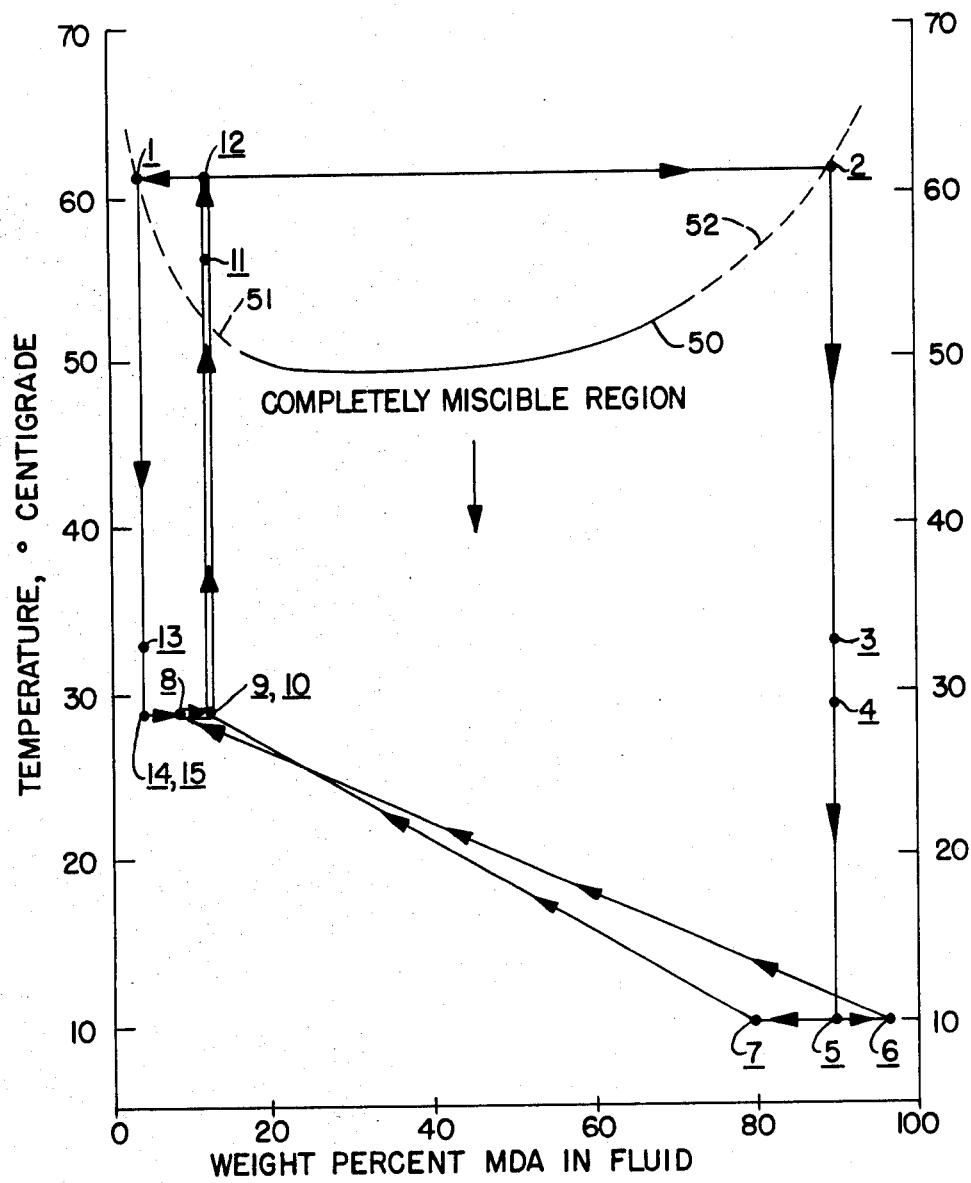
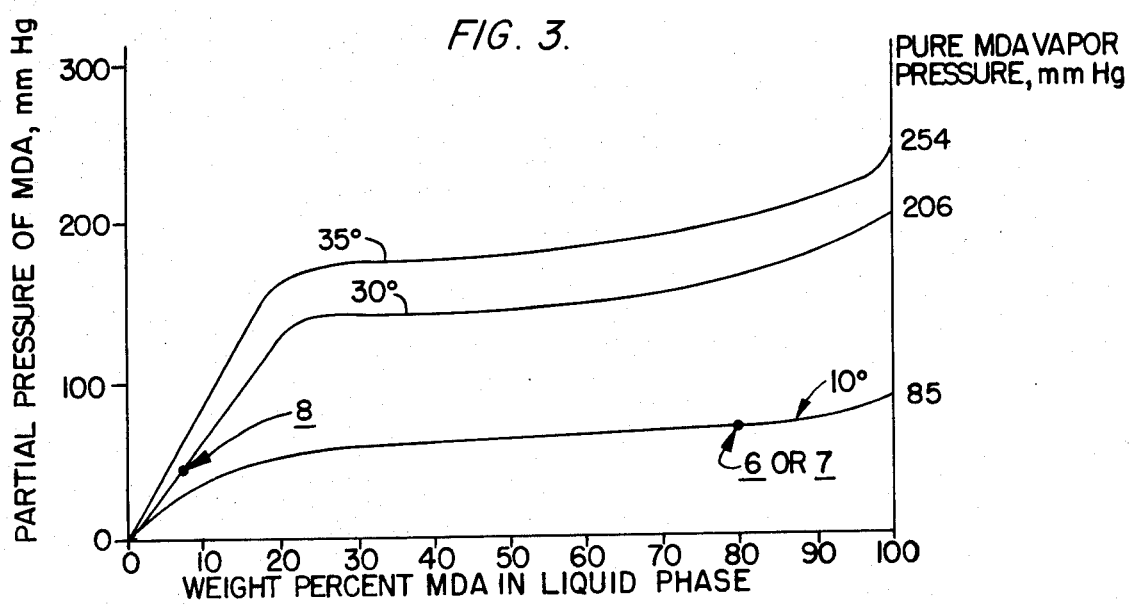

LIQUID PHASE SEPARATION IN ABSORPTION REFRIGERATION

BACKGROUND OF INVENTION

In all refrigeration systems the refrigeration depends upon the absorption of heat at a low temperature, achieved by the expansion and evaporation of a liquid refrigerant. Refrigerating systems differ in how the vaporized refrigerant is liquified to repeat the cycle. One refrigeration system uses a vapor-compression cycle where the refrigerant vapor is mechanically compressed to a high pressure and is then cooled to below its saturation temperature in a condenser, liberating its heat of condensation. It is then evaporated as the cycle is repeated. In these systems, the refrigerating fluid is isolated at all points in the cycle from any other fluid or gas, except for a heat-exchanging contact through the wall of the fluid container.

The second refrigeration system is generally known as absorption refrigeration. The refrigerant is mixed at certain portions of the cycle with at least one additional fluid, the absorbent. At other portions it is separated from the absorbent, although it may remain mixed with another fluid.

There are two types of absorption refrigerators. The conventional absorption refrigerator uses pumps to move the fluids and has a high and low pressure zone. A second type uses no pumps or external power except for heat.

Both types of absorption refrigerators produce a hot gaseous refrigerant at a high pressure. This refrigerant is condensed, discharging the latent heat of condensation to the surrounding.

The Prior Art

At its simplest, the prior art absorption refrigeration cycle is: heating to distill the refrigerant, cooling to condense the refrigerant, expanding to vaporize and refrigerate, and mixing to absorb the vaporized refrigerant in the absorbent. The refrigerant is thus vaporized and liquified twice in each cycle.

The two most common conventional absorption refrigerant systems are the $NH_3$-$H_2O$ and $H_2O$-LiBr. In the first, ammonia is the refrigerant and water is the absorbent while in the second, water is the refrigerant and lithium bromide is the absorbent. The refrigerant in each case is the fluid with the higher vapor pressure, e.g., the one with the lower boiling point.

The most common system is the $H_2O$-LiBr system, because the absorbent is practically non-volatile. The water is vaporized in a simple boiler. To achieve full rated capacity the boiler must be at 240° F. (116° C.) or higher. A one-half reduction in refrigeration capacity is incurred if the source temperature falls by about 40° F. (22° C.). Presently-used sources of heat input are waste steam and fossil fuels for industrial applications and, potentially, concentrating solar collectors. Waste heat below 212° F. in industrial applications and unfocussing solar collectors which operate at only 180° F. (90° C.) therefore do not produce rated output for this cycle.

The refrigerator has two pressure zones. The high pressure zone, includes the heat exchanger, boiler, and condenser. The low pressure zone, is the evaporator and the absorber.

A practical limitation on the $H_2O$-LiBr system is the requirement for a water-cooled condenser. The refrigerant, water, must be cooled to about 110° F. (43° C.) to condense it. If the condenser operates at higher temperatures, crystallization of the lithium bromide occurs in the heat exchanger as the temperature at that point rises. This shuts down the system.

The second widely used absorption system is $NH_3$—$H_2O$. Because the absorbent, water, is also volatile, the simple boiler must be replaced with a generator, analyzer, and rectifier, which collectively separate the ammonia gas from the water.

The high pressure side of a typical ammonia refrigerator operates at 300 psia and the low pressure side operates at 60 psia. The concentration of ammonia in the solution going into the generator is about 0.36. The source temperature in this case is 350° F., reducing the ammonia concentration to 0.12 for the solution leaving the generator for the absorber.

An advantage of the ammonia refrigerator is that the condenser may be air-cooled, since the ammonia temperature leaving it is about 120° F. (49° C.) This advantage is offset by the requirement for a higher generator temperature to operate the refrigerator, than that required by the lithium bromide refrigerator.

The ammonia-water cycle is also used in the pumpless absorbent refrigerator. This system was once sold by Servel, Inc., under the brand name Electrolux. It operated at about the same temperatures and pressures, perhaps 200 psi, as the above described conventional ammonia refrigerator. A slight pressure difference, caused by percolation in the generator created the driving force.

The prime difference was the introduction of a third fluid, hydrogen, into the evaporator and absorber section. Its purpose was to reduce the partial pressure of ammonia to the range required to operate the system. The hydrogen, which was neither condensed nor absorbed, did not enter the generator or condenser circuit.

An alternative to hydrogen is shown in U.S. Pat. Nos. 2,045,204 and 2,281,855. In each of these, a third fluid, propane, which, like hydrogen, circulates between the evaporator and absorber, and served primarily to reduce the partial pressure of ammonia. In addition it serves as an auxillary refrigerant. It is condensed in the absorber, but is immiscible in the ammonia-water solution, floating on top because of its lower density.

The propane is floated and decanted out of the absorber and back into the evaporator. Unlike hydrogen, it goes through a phase change, contributing some refrigerating effect. Unlike the ammonia it does not go through two phase changes per cycle, because it is immiscible in water and is separated due to its lower density.

The property of partial miscibility of liquids at certain temperatures is known. The lower consolute temperature is the critical temperature below which two liquids are miscible in any proportions. In U.S. Pat. No. 3,906,250, this property was proposed to drive a pressure retarded osmosis engine, in which the unmixed solutions selectively pass through a membrane to create the hydraulic driving force.

In 1958, the Battelle Memorial Institute submitted a report to the American Gas Association entitled "The Application to Absorption Refrigeration of Solution Systems Exhibiting Lower Consolute Behavior.". The report recognized that the phenomenon by which two liquids, completely miscible below a certain temperature, and immiscible above that temperature could provide the means to separate a refrigerant from an absorbent.

The report mentions several binary fluids, including triethylamine and water, with a lower critical solution temperature of 66° F. (19° C.), but does not mention methyl diethylamine. Further, the Battelle report does not describe any operating system nor state that any of the binary fluids disclosed would in fact form part of an operating system.

SUMMARY OF INVENTION

This refrigeration cycle eliminates the steps of vaporization and condensation of the refrigerant. It therefore does not require the input of the latent heat of the refrigerant and its subsequent removal. The cycle does not employ an absorbent which, if overheated, is likely to precipitate, rendering the machinery inoperative.

An absorption refrigerator will separate the absorbent and refrigerant if the two are partially miscible at elevated temperatures. Accordingly, it is an object of this invention to separate the two fluids by selecting them to be miscible at lower, heat sink, temperatures and partially miscible at higher, heat source, temperatures.

The conventional absorption refrigerator must have heat supplied to it at a temperature above the boiling point of the refrigerant. This limits the sources of heat, excluding such sources as unfocussed solar energy and waste heat below 200° F. When separation occurs in the liquid phase, it may be done at a lower temperature. Accordingly, it is an object of the present invention to separate the absorbent and refrigerant at a lower temperature, so that a lower temperature heat source may be used.

The conventional absorption refrigerator must supply the latent heat required to vaporize the refrigerant. The latent heat is then rejected in the condenser. The conventional absorption refrigerator, therefore, uses a great deal of heat and its applications are limited to instances where the fuel is inexpensive and the capital cost of the heater and condenser is small. When the refrigerant and absorber separate in the liquid phase much less heat is required. Solar collectors, for instance, are expensive to build but involve no fuel cost. Accordingly, it is an object of this invention to allow an absorption refrigerator to operate at lower source temperatures of heat input.

DESCRIPTION OF DRAWINGS

The invention will be further described with reference to the attached drawings in which:

FIG. 2 is a graph of temperature and concentration showing the cycle for both the liquid absorbent and refrigerant;

FIG. 3 is a graph of partial pressure and concentration of the refrigerant; and

Figure 1:
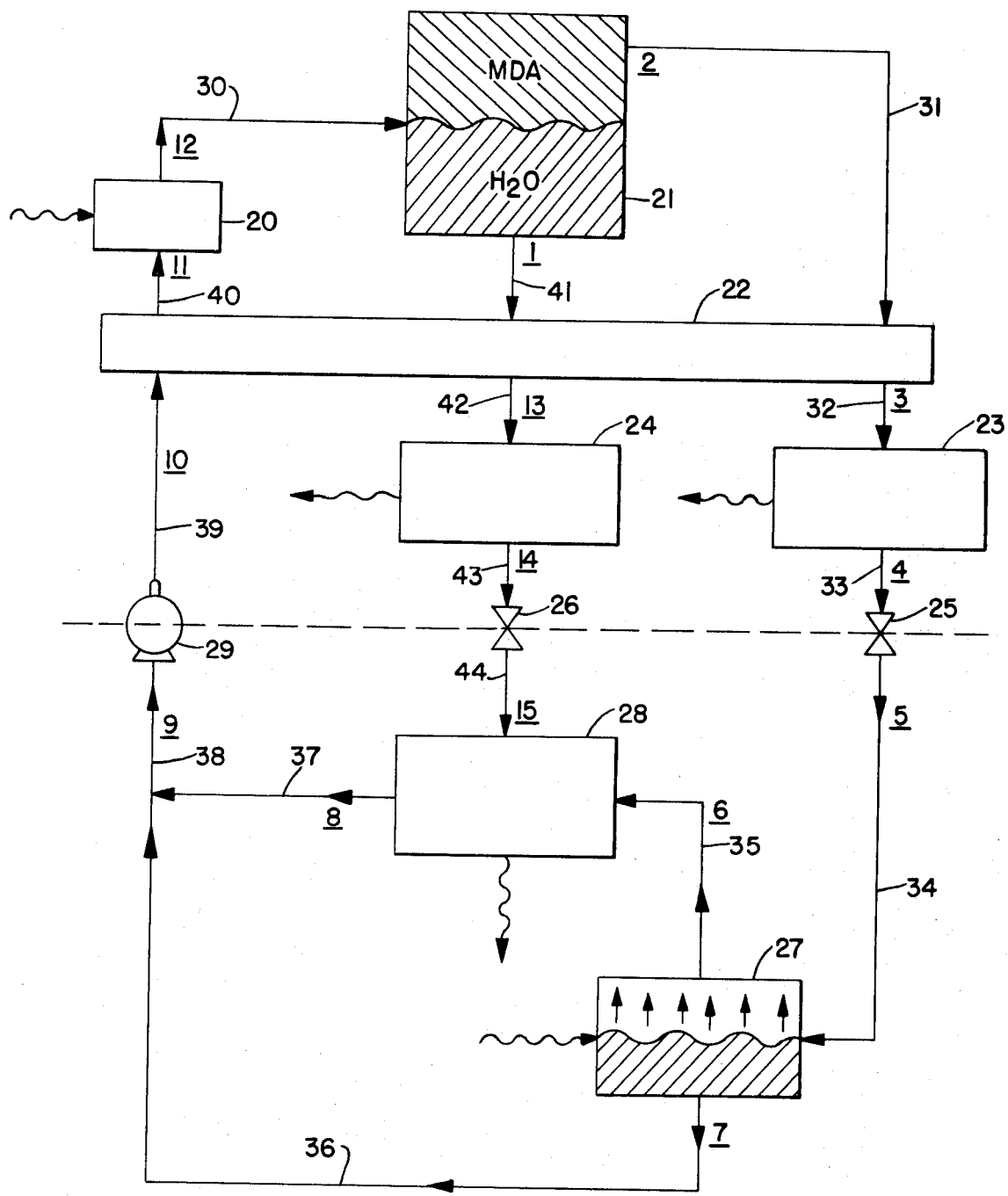
FIG. 1 is a schematic diagram of the cycle and equipment used in this system.

The refrigerator as schematically shown in FIG. 1, consists of a heater 20 for the strong solution, a gravity separator 21, a heat exchanger 22, refrigerant cooler 23, absorbent cooler 24, expansion valve 25, flow control valve 26, evaporator 27, absorber 28, and pump 29. The fluids and their temperatures and pressures at various points in the cycle are referred to as 1 through 13 on the other figures.

The refrigerant cycle is from heater 20, through pipe 30 to gravity separator 21, through pipe 31 to heat exchanger 22, through pipe 32 to refrigerant cooler 23, through pipe 33 to expansion valve 25, through pipe 34 to evaporator 27, then primarily through pipe 35 to absorber 28, through pipe 37 to pipe 38, and secondarily through pipe 36 directly to pipe 38 where the fluids recombine to go to pump 29 and then through pipe 39 to heat exchanger 22, pipe 40, returning to heater 20. Since the binary system may not separate completely, the refrigerant cycle will carry some absorbent and the absorbent cycle some refrigerant.

The absorbent cycle is from heater 20, through pipe 30 to gravity separator 21, pipe 41, to heat exchanger 22, through pipe 42 to absorbent cooler 24, through pipe 43 to flow control valve 26, through pipe 44 to absorber 28, and through pipes 37 and 38 to pump 29, through pipe 39 to heat exchanger 22, through pipe 40 returning to heater 20.

The operation of the system will be further described with respect to a system comprising 12% by weight methyl diethylamine (MDA) as a refrigerant and 88% water ($H_2O$) as an absorbent.

As shown in FIG. 2, any mixture of MDA-$H_2O$ is a completely miscible liquid at a temperature below line 50, about 50° C. At higher temperatures the fluids separate into two immiscible solutions along lines 51, primarily $H_2O$, and 52, primarily MDA.

As shown, fluid 12, 12% MDA at 61° C. separates into the two conjugate solutions 1, 97% $H_2O$, and 2, 88% MDA. The MDA fluid is cooled through heat exchanger and refrigerant cooler to 4 where it passes through expansion valve 25 to evaporator 27. The majority of the MDA evaporates, creating the useful cooling load, and going as 6 to the absorber 28. The remainder of the MDA, the bottom solution, is fed as fluid 7 directly to the pump.

A more complete listing of the conditions in this example appear in Table 1 below. The high pressure is 931 mm Hg and the low pressure is 77 mm Hg.

This binary solution has been selected, initially, because of the availability of data on its partial pressure. It has several limitations, as set out below, in addition to its toxicity.

TABLE 1

| Fluid | Temp. °C. | % MDA in MDA-water mixture | Wt.MDA gms. | Wt.$H_2O$ gms. |
|---|---|---|---|---|
| 1 | 61 | 3 | 0.55 | 17.80 |
| 2 | 61 | 88 | 1.96 | 0.27 |
| 3 | 33 | 88 | 1.96 | 0.27 |
| 4 | 29 | 88 | 1.96 | 0.27 |
| 5 | 10 | 88 | 1.96 | 0.27 |
| 6 | 10 | 97 | 1.00 | 0.03 |
| 7 | 10 | 80 | 0.96 | 0.24 |
| 8 | 29 | 8 | 1.55 | 17.83 |
| 9 | 29 | 12 | 2.51 | 18.07 |
| 10 | 29 | 12 | 2.51 | 18.07 |
| 11 | 57 | 12 | 2.51 | 18.07 |
| 12 | 61 | 12 | 2.51 | 18.07 |
| 13 | 33 | 3 | 0.55 | 17.80 |
| 14 | 29 | 3 | 0.55 | 17.80 |
| 15 | 29 | 3 | 0.55 | 17.80 |

The heat transfer calculations are based upon an assumed 4° C. differential. The amount of heat transferred is:

TABLE 2

| Element | Heat In (cal) | Heat Out (cal) | Temp °C. |
| --- | --- | --- | --- |
| Heater | 91 | | 65 |
| Heat Exchanger | (522) | (522) | 29–61 |
| Absorbent | | | |
| Cooler | | 73 | 25 |
| Refrigerant | | | |
| Cooler | | 5 | 25 |
| Absorber | | 89 | 25 |
| Evaporator | 76 | | 10 |

The cooling capacity of a refrigerator, either absorption or compression, is a function of the amount of refrigerant evaporated and condensed or absorbed. Optimizing this capacity involves balancing of many factors, as is well known to those skilled in the art. Simultaneous higher partial pressure of MDA in the evaporator and lower partial pressure of MDA in the absorber makes absorption easier. These higher partial pressures may be achieved only by lower partial distillation in the evaporator. This in turn requires a higher circulation of refrigerant fluid for a given evaporation rate.

Figure 4:
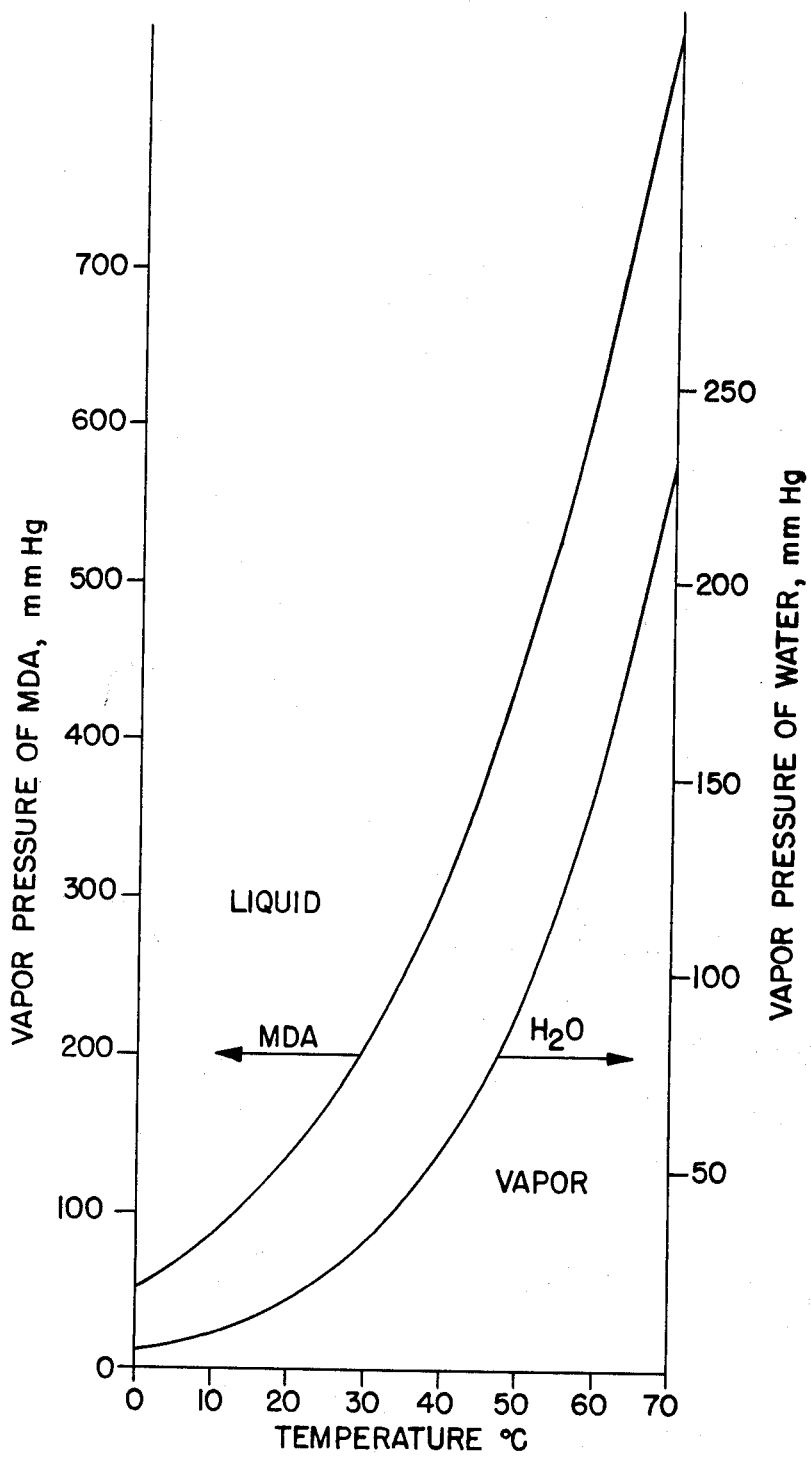
FIG. 4 is a phase graph of pressure and temperature for both the refrigerant and the absorbent.

The absorber is limited in the amount of MDA which will go from the vapor phase to the liquid phase. The limit is the total pressure of the low pressure section minus the partial pressure of the absorbent. In this example, the total pressure is 77 mm Hg, the partial pressure of water in the absorbent is 32 mm Hg, see FIG. 4, the partial pressure of MDA is therefore 45 mm Hg, which at 30° C. means a 7% concentration, see FIG. 3. The excess vapor pressure of MDA, 68 mm Hg serves only as a driving force.

The twin objectives of a refrigerating system are to reduce fuel or running costs and to reduce capital costs. In an absorbent refrigerator, the running costs are dependent upon heat input to the system while the C.O.P. measures the efficiency. The capital costs are largely dependent on the required amount of heat transfer or heat exchange.

In the above example, the C.O.P. is 76/91 or 0.84 which compares quite favorably with other systems. The ratio of total heat exchange to useful cooling is, however, 12/1, as compared with 5/1 of the conventional LiBr cycle.

There are two principal reasons for this high heat ratio in this selected binary system. First, MDA has a relatively low latent heat. Other binary systems could be selected where the refrigerant, such as water, had a higher latent heat. Secondly, as shown in FIG. 3, the MDA-$H_2O$ is highly non-ideal. For the 8% MDA solution at 29° C. the partial pressure of MDA for equilibrium is nearly three times the ideal. This means that the concentration of MDA in water is much less than it would be for an ideal solution.

The concentration of MDA obtainable in the absorber is a good function of the capacity of the system. FIG. 3 shows the maximum partial pressure of MDA at 10° C. as 85 mm Hg which means a theoretical maximum concentration of MDA at 29° C. of about 10%.

The optimum components of a system begin with the two temperatures of interest. The evaporator temperature is the temperature desired for the particular refrigerating or air conditioning application. The absorber temperature should be the lowest temperature possible, since the lower it is the more efficient the cycle is. The available heat sink, e.g., ambient air, defines the absorber temperature. A refrigerant should be selected which, at the evaporator temperature, has a vapor pressure equal to the partial pressure, at the absorber temperature of as rich a solution as possible. This reduces the amount of absorbent which must be pumped, and more importantly, heated and cooled during each cycle. Additional possible binary liquids for this conjugate cooling include butyl cellosolve as refrigerant and water as absorbent, and 1-methyl piperidine as refrigerant and water as absorbent.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by Letters Patent of the United States is:

1. The method of cooling which comprises,
    (a) selecting a binary solution of absorbent and refrigerant liquids which are completely miscible below a certain temperature and only partly miscible above said temperature,
    (b) increasing the pressure of said binary solution to prevent vaporization of said liquids during the heating and separating steps,
    (c) heating said binary mixture, by means of a heat source, to a temperature above that of complete miscibility,
    (d) separating the refrigerant-rich liquid solution and absorbent-rich liquid solution thus formed,
    (e) separately cooling each solution by a heat sink,
    (f) reducing the pressure of said refrigerant-rich solution, thereby reducing the temperature of the solution due to partial evaporation,
    (g) further evaporating part of the refrigerant-rich solution by absorption of heat to produce useful cooling,
    (h) reducing the pressure of the absorbent-rich solution to the pressure of the evaporator,
    (i) mixing the refrigerant vapor from the evaporator and the absorbent-rich solution to absorb the vapor,
    (j) mixing solution from step (i) with the unevaporated solution from step (g), pressurizing the mixture as in step (b), thus completing the cycle.

* * * * *